(12) United States Patent
Chang et al.

(10) Patent No.: US 11,848,608 B2
(45) Date of Patent: Dec. 19, 2023

(54) CIRCUIT AND METHOD FOR CONTROLLING SWITCHING REGULATOR WITH ULTRASONIC MODE

(71) Applicant: ALPHA AND OMEGA SEMICONDUCTOR INTERNATIONAL LP, Toronto (CA)

(72) Inventors: Chi-Kuang Chang, Xinpu Township (TW); Cheng-Hsiung Tsai, New Taipei (TW)

(73) Assignee: ALPHA AND OMEGA SEMICONDUCTOR INTERNATIONAL LP, Toronto (CA)

( * ) Notice: Subject to any disclaimer, the term of this patent is extended or adjusted under 35 U.S.C. 154(b) by 90 days.

(21) Appl. No.: 17/701,873

(22) Filed: Mar. 23, 2022

(65) Prior Publication Data

US 2023/0308018 A1    Sep. 28, 2023

(51) Int. Cl.
  *H02M 3/156* (2006.01)
  *H02M 1/00* (2006.01)

(52) U.S. Cl.
  CPC ......... *H02M 3/156* (2013.01); *H02M 1/0009* (2021.05)

(58) Field of Classification Search
  CPC ..... G05F 1/00; G05F 1/10; G05F 1/12; G05F 1/46; G05F 1/455; G05F 1/45; G05F 1/445; G05F 1/66; G05F 1/04; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566;
  (Continued)

(56) References Cited

U.S. PATENT DOCUMENTS 7,646,185 B2 *   1/2010   Kim ................... H02M 3/1588
                                              323/283
9,837,899 B2 *  12/2017   Li .......................... H02M 3/157
  (Continued)

*Primary Examiner* — Jeffrey A Gblende
(74) *Attorney, Agent, or Firm* — Chen-Chi Lin

(57) ABSTRACT

A control circuit for controlling a switching regulator includes a timer, a comparator, a driver circuit and a controller. The timer generates an input signal indicative of whether a predetermined amount of time has elapsed since an activation of a drive signal. The comparator is configured to compare a feedback voltage with a reference voltage to generate a comparison signal. The driver circuit is controlled by a control signal to generate the drive signal according to one of the input signal and the comparison signal. The control signal indicates whether a mode is enabled. When the mode is enabled, the driver circuit is configured to generate the drive signal according to the input signal. The controller is configured to, in response to an activation of the input signal, generate the control signal according to a result of a comparison of the feedback voltage with another reference voltage higher than the reference voltage.

20 Claims, 8 Drawing Sheets

(58) Field of Classification Search
CPC ............ H02M 3/1582; H02M 3/1584; H02M 2003/1557; H02M 1/0032; H02M 1/4225; H02M 7/217; H02M 1/0025; H02M 1/0045; H05B 39/08; B23K 11/24; H04B 2215/069
See application file for complete search history.

(56) References Cited

U.S. PATENT DOCUMENTS

| | | | |
|---|---|---|---|
| 9,899,913 B2 * | 2/2018 | Chang | H02M 3/156 |
| 9,986,607 B2 * | 5/2018 | Park | H05B 45/3725 |
| 10,892,681 B2 * | 1/2021 | Fukushima | H02M 3/158 |

* cited by examiner

CIRCUIT AND METHOD FOR CONTROLLING SWITCHING REGULATOR WITH ULTRASONIC MODE

FIELD OF THE INVENTION

The present disclosure relates generally to control of switching regulation. More particularly, the present disclosure relates to a control circuit for controlling a switching regulator, and a control method for controlling the switching regulator.

BACKGROUND OF THE INVENTION

A switching regulator usually utilizes loop control for converting an input voltage to an output voltage. The loop control can feed the output voltage back to a control circuit, which is arranged for chopping the input voltage and smoothing it out to match the desired output voltage. The control circuit may employ pulse width modulation (PWM) or pulse frequency modulation (PFM) techniques to control switching operation. Under light load conditions, the switching loss in the PWM control scheme would become predominant due to the fixed switching frequency. As a result, the PFM technique, which allows the switching frequency to be reduced, is commonly used for improving the efficiency at light loads. However, when the switching frequency falls within an audible frequency range such as 20 Hz to 20 kHz, audible noise is obviously produced due to the piezoelectric effect in capacitors.

SUMMARY OF THE INVENTION

A control circuit is used for controlling a switching regulator. A control method is applied for controlling a switching regulator.

In examples of the present disclosure, a control circuit for controlling a switching regulator is disclosed. The control circuit includes a first timer, a first comparator, a driver circuit and a controller. The first timer is configured to generate a first input signal indicative of whether a first predetermined amount of time has elapsed since activation of a drive signal. A first switch of the switching regulator is controlled by the drive signal. The first comparator is configured to compare a feedback voltage with a first reference voltage to generate a first comparison signal. The feedback voltage is indicative of an output voltage of the switching regulator. The driver circuit, coupled to the first timer and the first comparator, is controlled by a control signal to generate the drive signal according to one of the first input signal and the first comparison signal. The control signal indicates whether a mode of the switching regulator is enabled. When the control signal indicates that the mode is enabled, the driver circuit is configured to generate the drive signal according to the first input signal. The controller is coupled to the driver circuit and the first timer. The controller is configured to, in response to activation of the first input signal, generate the control signal according to a result of a comparison of the feedback voltage with a second reference voltage higher than the first reference voltage.

In examples of the present disclosure, a control method of a switching regulator is provided. The control method includes: measuring a first elapsed time since activation of a first switch of the switching regulator, and accordingly generating a first input signal indicative of whether the first elapsed time reaches a first predetermined amount of time; comparing a feedback voltage with a first reference voltage to generate a first comparison signal, wherein the feedback voltage is indicative of an output voltage of the switching regulator; comparing the feedback voltage with a second reference voltage higher the first reference voltage to generate a second comparison signal; generating a control signal according to the second comparison signal when the first input signal is activated, wherein the control signal is indicative of whether a mode of the switching regulator is enabled; when the control signal indicates that the mode is enabled, turning on the first switch according to the first input signal; and when the control signal indicates that the mode is disabled, turning on the first switch according to one of the first input signal and the first comparison signal.

With the use of the proposed control scheme, a control circuit used for a switching regulator can be implemented using a relatively simple circuit structure to keep a switching frequency outside an audible frequency range under light load conditions, thereby reducing/eliminating audible noise resulting from switching operation. Moreover, the control circuit can flexibly extend on-time of a switch, e.g. a low-side switch, thereby achieving energy balance without causing functional failure.

DETAILED DESCRIPTION OF THE INVENTION

PFM operation of a switching regulator can be implemented using constant-on-time (COT) control. To reduce audible noise in a COT switching regulator at light loads, a switching frequency thereof would be kept higher than the upper audible limit of human hearing. One method for keeping the switching frequency outside an audible frequency range is to detect a peak point of an output voltage and accordingly control switching operation. However, such method has to apply an offset voltage to determine the peak point. An offset cancellation circuit is needed, thus resulting in increased design complexity.

The present disclosure describes exemplary control circuits, each of which can utilize a timer for setting a switching period of a switching regulator at light loads. For example, the timer may have a timeout period, whose reciprocal is greater than the upper limit of the audible frequency range. The timer can be started when a drive signal is asserted/activated for turning on a first switch. The drive signal is subsequently de-asserted/deactivated after a period of time. When the timeout period has elapsed since the drive signal was asserted, the timer can output a control signal for asserting/activating the drive signal again. As a result, the first switch can be forcibly turned on at a switching frequency above the upper limit of the audible frequency range. The first switch may be, but is not limited to, a high-side switch of the switching regulator. In one example, the exemplary control circuit may include another timer for determining whether to extend on-time of a second switch at light loads. The second switch may be, but is not limited to, a low-side switch of the switching regulator. Thus, even under very light load conditions, the exemplary control circuit can effectively achieve energy balance.

The present disclosure describes exemplary control methods of switching regulators. The exemplary control method can enable a switching regulator to enter a mode, in which a switching frequency of the switching regulator is maintained above the upper limit of the audible frequency range. For example, before the switching regulator enters the mode, the exemplary control method can regulate an output voltage by comparing a feedback voltage with a first reference voltage. In the meantime, the exemplary control method may determine whether to enable the mode by comparing the feedback voltage with a second reference voltage higher than the first reference voltage. In one example, when the mode is enabled, the exemplary control method may determine whether to disable the mode by comparing the feedback voltage with a third reference voltage lower than the first reference voltage. Further description is provided below.

Figure 1:
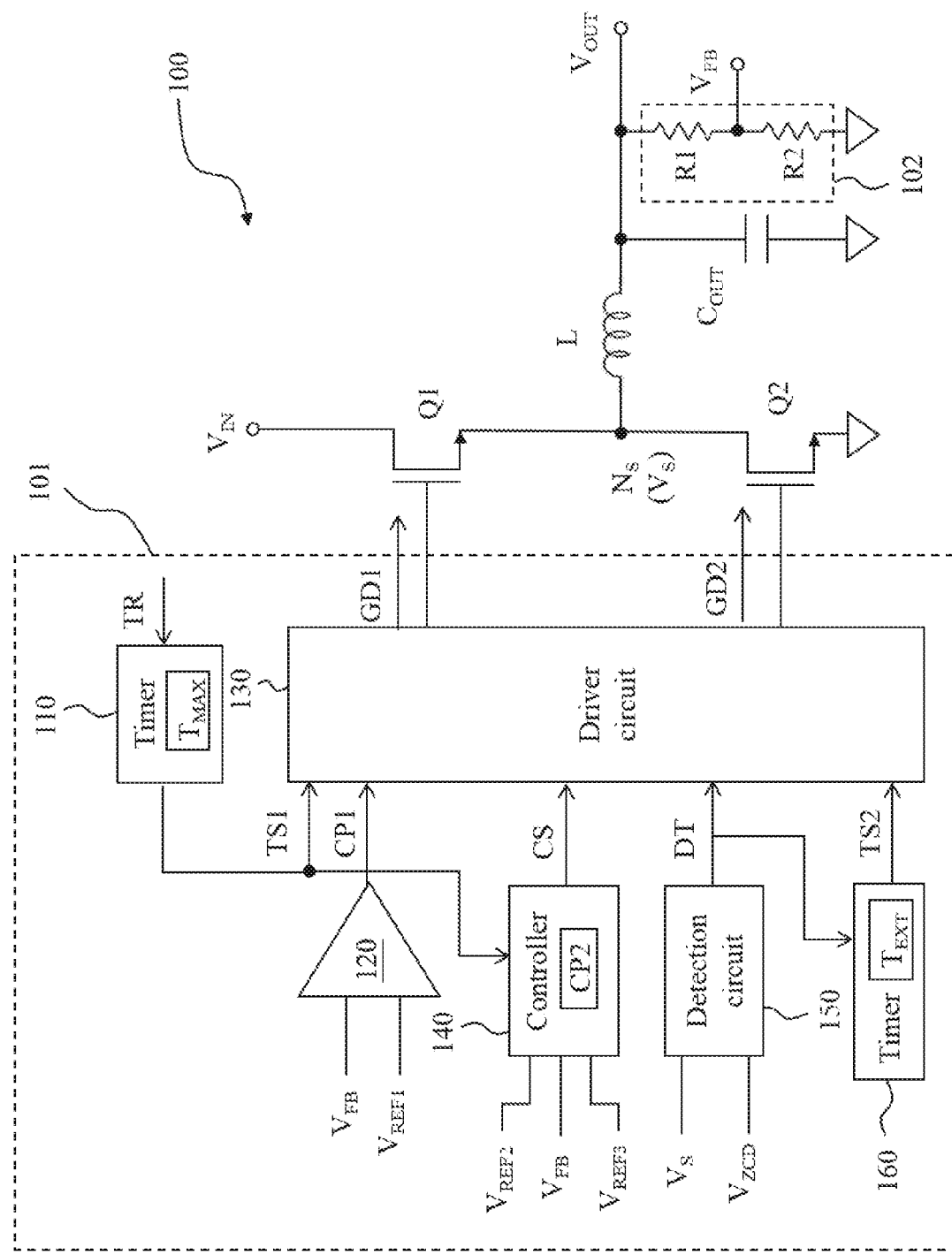
FIG. 1 illustrates an exemplary switching regulator in examples of the present disclosure.

FIG. 1 illustrates an exemplary switching regulator in examples of the present disclosure. The switching regulator 100 is configured to convert an input voltage VIN to an output voltage $V_{OUT}$. In examples of the present disclosure, the switching regulator 100 can be implemented as a buck or step-down converter for illustrative purposes. Those skilled in the art will appreciate that the switching regulator 100 can be implemented as other types of power converters without departing from the scope of the present disclosure.

The switching regulator 100 may include a plurality of switches Q1 and Q2, an inductor L, a capacitor $C_{OUT}$ and a control circuit 101. The switch Q1, which may be referred to as a high-side switch, is arranged to couple the input voltage VIN to a node $N_S$ according to a drive signal GD1. The switch Q2, which may be referred to as a low-side switch, is arranged to couple the node $N_S$ to a reference potential according to a drive signal GD2. For example, the switch Q1 can be turned on or turned off according to a level difference between the drive signal GD1 and a voltage $V_S$ at the node $N_S$. The switch Q2 can be turned on or turned off according to a level difference between the drive signal GD2 and the reference potential, such as a ground potential. The inductor L and the capacitor $C_{OUT}$ may function as a filter to filter the voltage $V_S$ to produce the output voltage $V_{OUT}$.

The control circuit 101, coupled to the switches Q1 and Q2, is configured to generate the drive signals GD1 and GD2. The drive signals GD1 and GD2 may be two non-overlapping signals. In examples of the present disclosure, the control circuit 101 may employ a COT control scheme for output regulation. For example, the drive signal GD1 for controlling the switch Q1 includes a series of pulses, each having a same pulse width. Under a light load condition, the control circuit 101 can keep a pulse frequency of the drive signal GD1 outside an audible frequency range, e.g. 20 Hz to 20 kHz, to reduce/eliminate audible noise.

The control circuit 101 may include a timer 110, a comparator 120, a driver circuit 130, a controller 140, a detection circuit 150 and a timer 160. The timer 110 is configured to generate an input signal TS1 indicative of whether a predetermined amount of time $T_{MAX}$ has elapsed since activation/assertion of the drive signal GD1. For example, the timer 110 can be configured to measure an elapsed time since the drive signal GD1 was activated for turning on the switch Q1. The input signal TS1 can indicate whether the elapsed time reaches the predetermined amount of time $T_{MAX}$.

In examples of the present disclosure, the timer 110 can be activated by a trigger signal TR1. An assertion of the trigger signal TR1 can trigger an assertion of the drive signal GD1. As a result, the timer 110 can be configured to measure or count an elapsed time since activation of the drive signal GD1. The predetermined amount of time $T_{MAX}$ can serve as a timeout period of the timer 110. The input signal TS1 can indicate whether the timeout period expires. In one example, the trigger signal TR1 can be implemented using other signals indicative of activation of the drive signal GD1 without departing from the scope of the present disclosure. For example, the drive signal GD1 may serve as the trigger signal TR1 such that the timer 110 can be activated directly by the drive signal GD1.

The comparator 120 is configured to compare a feedback voltage $V_{FB}$ with a reference voltage $V_{REF1}$ to generate a comparison signal CP1. The feedback voltage $V_{FB}$ can be indicative of the output voltage $V_{OUT}$ of the switching regulator 100. For example, a feedback network 102 is arranged to provide the feedback voltage $V_{FB}$ in response to the output voltage $V_{OUT}$ applied thereto. The feedback network 102 can be implemented using a voltage divider which includes resistors R1 and R2.

The driver circuit 130, coupled to the timer 110 and the comparator 120, can be controlled by a control signal CS to generate the drive signal GD1 according to one of the input signal TS1 and the comparison signal CP1. The control signal CS can indicate whether a mode of the switching regulator is enabled. The switching regulator 100 operating in the mode can have a switching frequency kept higher than an upper limit of the audible frequency range. The mode may therefore be referred to as an ultrasonic mode.

In examples of the present disclosure, when the control signal CS indicates that the mode is enabled, the driver circuit 130 can be configured to generate the drive signal GD1 according to the input signal TS1. The drive signal GD1 can have a period equal to the predetermined amount of time $T_{MAX}$, e.g. a timeout period of the timer 110. A frequency of the drive signal GD1 can be kept outside an audible frequency range when the mode is enabled. For example, the predetermined amount of time $T_{MAX}$ may be equal to a maximum permissible switching period of the switching regulator 100. A reciprocal of the maximum permissible switching period is higher than an upper limit of the audible frequency range. Thus, when the mode is enabled, a switching frequency of the switching regulator 100 can be kept higher than the upper limit of the audible frequency range even under light load conditions.

When the control signal CS indicates that the mode is disabled, the driver circuit 130 can be configured to generate the drive signal GD1 according to one of the input signal TS1 and the comparison signal CP1. For example, when the input signal TS1 indicates that the timer 110 expires, the driver circuit 130 can turn on the switch Q1 in response to activation of the input signal TS1. When the input signal TS1 indicates that the timer 110 has not expired, the driver circuit 130 can turn on the switch Q1 according to the comparison signal CP1.

The controller 140 is coupled to the driver circuit 130 and the timer 110. The controller 140 can be configured to, in response to activation of the input signal TS1, generate the control signal CS according to a result of a comparison of the feedback voltage $V_{FB}$ with a reference voltage $V_{REF2}$, which is higher than the reference voltage $V_{REF1}$. For example, when the input signal TS1 is activated and the feedback voltage $V_{FB}$ is higher than the reference voltage $V_{REF2}$, the controller 140 can generate the control signal CS indicating that the mode is enabled. In examples of the present disclosure, the controller 140 can be further configured to compare the feedback voltage $V_{FB}$ with a reference voltage $V_{REF3}$, which is lower than or equal to the reference voltage $V_{REF1}$, to thereby generate the control signal CS. For example, when the feedback voltage $V_{FB}$ is lower than the reference voltage $V_{REF3}$, the control signal CS can indicate that the mode is disabled.

The detection circuit 150, coupled to the driver circuit 130, is configured to generate a detection signal DT by detecting if an inductor current $I_L$ flowing through the inductor L reaches a current threshold, such as a zero current threshold. When the control signal CS indicates that the mode is disabled, the driver circuit 130 can be configured to turn off the switch Q2 according to the detection signal DT. When the control signal CS indicates that the mode is enabled, the driver circuit 130 can be configured to turn off the switch Q2 according to a comparison signal CP2, i.e. a result of a comparison of the feedback voltage $V_{FB}$ with the reference voltage $V_{REF2}$.

In examples of the present disclosure, the detection circuit 150 can be configured to detect if the voltage $V_S$ reaches a reference voltage $V_{ZCD}$, thereby detecting if the inductor current $I_L$ reaches the current threshold. The detection signal DT can indicate if the voltage $V_S$ falls below the reference voltage $V_{ZCD}$. When the detection signal DT indicates that the voltage $V_S$ is higher the reference voltage $V_{ZCD}$, the inductor current $I_L$ may be greater than the current threshold. When the detection signal DT indicates that the voltage $V_S$ drops below the reference voltage $V_{ZCD}$, the inductor current $I_L$ may have reached the current threshold.

The timer 160, coupled to the driver circuit 130 and the detection circuit 150, is configured to generate an input signal TS2 that is indicative of whether a predetermined amount of time $T_{EXT}$ has elapsed since the inductor current $I_L$ reached the current threshold. When the control signal CS indicates that the mode is enabled, the driver circuit 130 can be configured to turn off the switch Q2 according to the input signal TS2. For example, the timer 160 can be activated by the detection signal DT to measure an elapsed time since the voltage $V_S$ reached the reference voltage $V_{ZCD}$. The input signal TS2 can indicate whether the elapsed time reaches the predetermined amount of time $T_{EXT}$, e.g. a timeout period of the timer 160. When the timer 160 expires in the mode, the driver circuit 130 can generate the drive signal GD2 according to the input signal TS2 to thereby turn off the switch Q2.

In operation, the timer 110 is started in response to activation of the switch Q1. After a predetermined on-time has elapsed, the driver circuit 130 can turn off the switch Q1 and turn on the switch Q2. Under relatively heavy load conditions, the feedback voltage $V_{FB}$ would drop below the reference voltage $V_{REF1}$ before the timer 110 expires. The switching regulator 100 can operate at a switching frequency outside an audible frequency range. The control signal CS can have a signal level or bit pattern to indicate that the switching regulator 100 does not enter a mode, i.e. an ultrasonic mode. When the detection signal DT indicates that the inductor current $I_L$ reaches the current threshold, the driver circuit 130 can generate the drive signal GD2 to turn off the switch Q2.

When a load connected to the switching regulator 100 decreases, the timer 110 would expire before the feedback voltage $V_{FB}$ falls below the reference voltage $V_{REF1}$. For example, under relatively light conditions, the input signal TS1 is activated. When the feedback voltage $V_{FB}$ is higher than the reference voltage $V_{REF2}$, the controller 140 can generate the control signal CS, which indicates that the mode is enabled, in response to activation of the input signal TS1. The driver circuit 130 can turn on the switch Q1 according to the input signal TS1. A switching period of the switching regulator 100 can be equal to the predetermined amount of time $T_{MAX}$. Similarly, after a predetermined on-time has elapsed since activation of the switch Q1, the driver circuit 130 can turn off the switch Q1 and turn on the switch Q2. Note that, in the mode, the driver circuit 130 can delay the time at which the switch Q2 is turned off. For example, when the detection signal DT indicates that the inductor current $I_L$ reaches the current threshold, the driver circuit 130 would not turn off the switch Q2. Instead, the driver circuit 130 may turn off the switch Q2 when the comparison signal CP2 indicates that the feedback voltage $V_{FB}$ is lower than the reference voltage $V_{REF2}$. As another example, the timer 160 is started when the detection signal DT indicates that the inductor current $I_L$ reaches the current threshold. The timer 160 may expire before the feedback voltage $V_{FB}$ drops below the reference voltage $V_{REF2}$. The driver circuit 130 can turn off the switch Q2 in response to activation of the input signal TS2.

Next, when the load connected to the switching regulator 100 increases, the mode can be disabled or released such that the switching regulator 100 can leave the mode. For example, when the feedback voltage $V_{FB}$ drops below the reference voltage $V_{REF3}$, the control signal CS can indicate that the mode is disabled. The reference voltage $V_{REF3}$ can be lower than the reference voltage $V_{REF1}$.

The architecture shown in FIG. 1 is provided for illustrative purposes, and is not intended to limit the scope of the present disclosure. In one example, the timer 160 may be optional. In some embodiment, the reference voltage $V_{REF1}$ can serve as the reference voltage $V_{REF3}$. In one example, the switching regulator 100 can be implemented using other buck converter topologies. To facilitate an understanding of the present disclosure, an exemplary implementation of the control circuit 101 shown in FIG. 1 is given below for further description of the proposed control scheme for a switching regulator. Other circuit implementations employing the architecture shown in FIG. 1 are contemplated as within the scope of the present disclosure.

Figure 2:
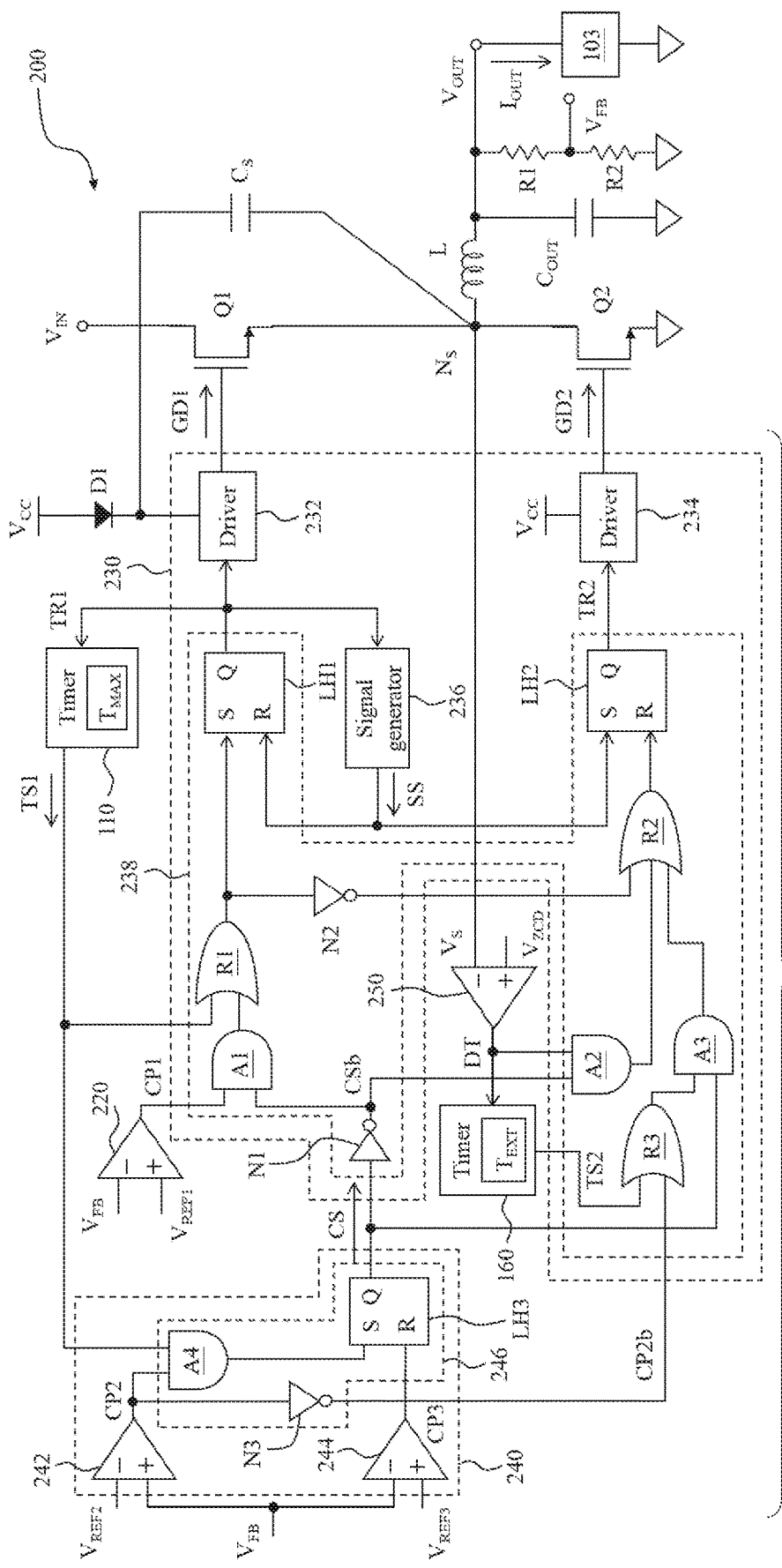
FIG. 2 is an implementation of the control circuit shown in FIG. 1 in examples of the present disclosure.

FIG. 2 is an implementation of the control circuit 101 shown in FIG. 1 in examples of the present disclosure. In examples of the present disclosure, the control circuit 201 is used for controlling a switching regulator 200, which serves as an embodiment of the switching regulator 100 shown in FIG. 1. The control circuit 201 may include the timers 110 and 160 shown in FIG. 1, a comparator 220, a driver circuit 230, a controller 240, and a detection circuit 250. The comparator 220, the driver circuit 230, the controller 240 and the detection circuit 250 can represent embodiments of the comparator 120, the driver circuit 130, the controller 140 and the detection circuit 150 shown in FIG. 1, respectively.

The driver circuit 230 may include, but is not limited to, drivers 232 and 234, an on-time signal generator 236 and a logic circuit 238. The driver 232 can be supplied by a supply voltage $V_{CC}$ through a diode D1, which is coupled to the node $N_S$ through a capacitor $C_S$. The driver 232 is configured to generate the drive signal GD1 according to the trigger signal TR1. The driver 234, supplied by the supply voltage $V_{CC}$, is configured to generate the drive signal GD2 according to the trigger signal TR2. The on-time signal generator 236 is configured to generate an on-time control signal SS according to the trigger signal TR1. For example, after a predetermined period of time has elapsed since activation of the trigger signal TR1, the on-time signal generator 236 can assert the on-time control signal SS.

The logic circuit 238 may include AND gates A1-A3, inverters N1 and N2, OR gates R1-R3, and SR latches LH1 and LH2. The reset input R of the SR latch LH1 and the set input S of the SR latch LH2 are both coupled to the on-time control signal SS. As a result, when the SR latch LH1 changes to the reset state, the SR latch LH2 may change to the set state. In other words, when the driver 232 triggered by the trigger signal TR1 turns off the switch Q1, the driver 234 triggered by the trigger signal TR2 may turn on the switch Q2.

The controller 240 may include comparators 242 and 244, and a logic circuit 246. The comparator 242 is configured to compare the feedback voltage $V_{FB}$ with the reference voltage $V_{REF2}$ to generate the comparison signal CP2. The comparator 242 is configured to compare the feedback voltage $V_{FB}$ with the reference voltage $V_{REF3}$ to generate a comparison signal CP3. The logic circuit 246 is coupled to the timer 110, the comparator 242 and the comparator 244. When the input signal TS1 is activated, the logic circuit 246 can be configured to set the control signal CS to a signal level according to the comparison signal CP2. The logic circuit 246 can be further configured to set the control signal CS to another signal level according to the comparison signal CP3. For example, the logic circuit 246 may include an AND gate A4, an inverter N3 and an SR latch LH3. When the input signal TS1 is activated due to expiration of timer 110, the AND gate A4 can set the state of the set input S of the SR latch LH3 according to the comparison signal CP2. In addition, the comparison signal CP3 is inputted to the reset input R of the SR latch LH3 to thereby set the state of the reset input R.

Figure 3:
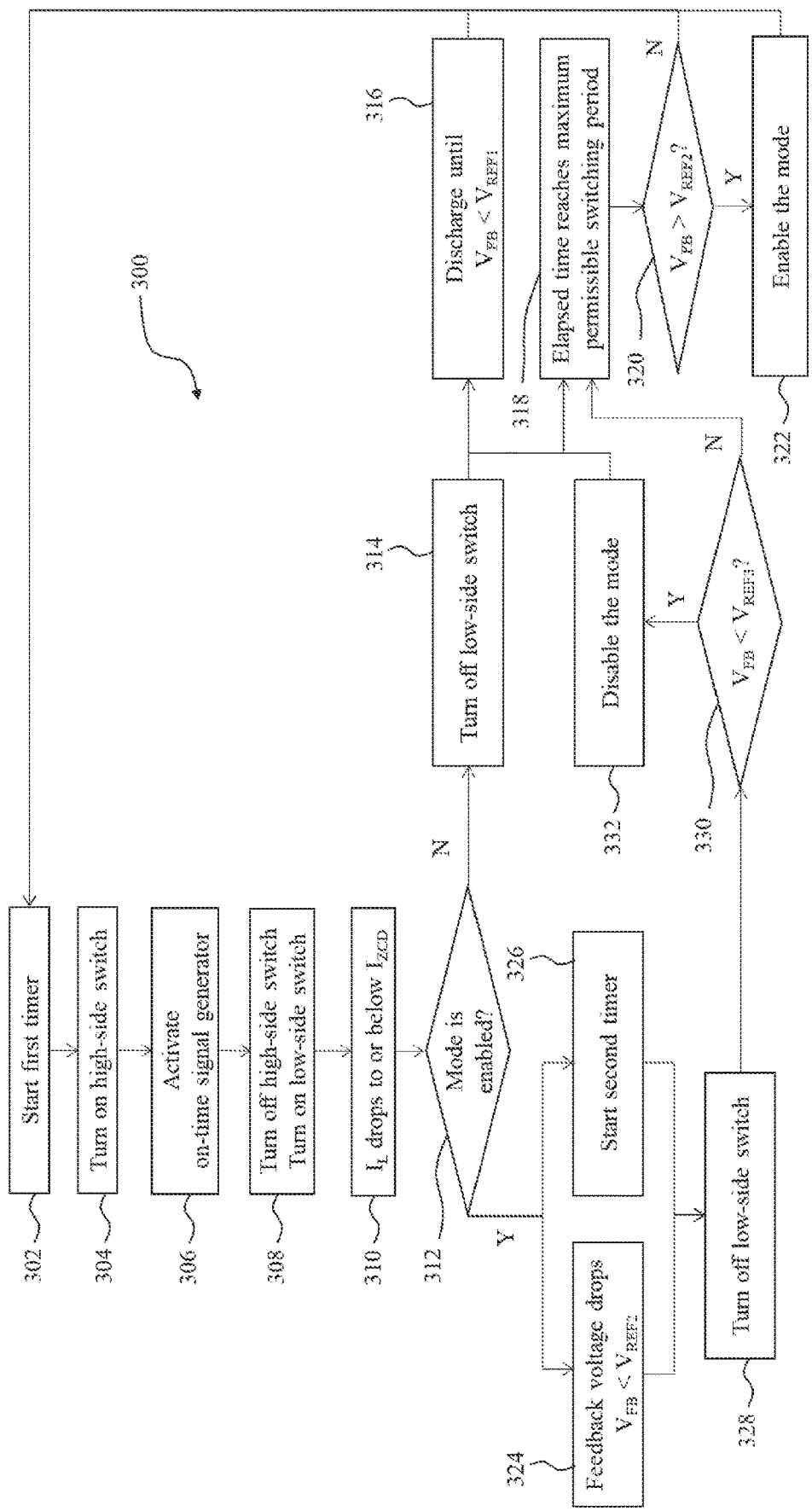
FIG. 3 is a flow chart of an exemplary control method of the switching regulator shown in FIG. 2 in examples of the present disclosure.

FIG. 3 is a flow chart of an exemplary control method of the switching regulator 200 shown in FIG. 2 in examples of the present disclosure. Note that the control method 300 can be employed for controlling the switching regulator 100 shown in FIG. 1 without departing from the scope of the present disclosure. Additionally, in one example, other operations in the control method 300 can be performed. In one example, operations of the control method 300 can be performed in a different order and/or vary.

Referring to FIG. 3 and also to FIG. 2, at operation 302, the timer 110 is started to measure an elapsed time since activation of the trigger signal TR1. At operation 304, the driver 232 can assert the drive signal GD1 in response to activation of the trigger signal TR1, and accordingly turn on the switch Q1. At operation 306, the on-time signal generator 236 is activated by the trigger signal TR1 to count an elapsed time since activation of the trigger signal TR1. At operation 308, the on-time signal generator 236 can assert the on-time control signal SS when the elapsed time reaches a predetermined on-time. The output Q of the SR latch LH1 goes low, and the output Q of the SR latch LH2 goes high. As a result, the driver 232 turns off the switch Q1, and the driver 234 turns on the switch Q2. The inductor current $I_L$ decreases, resulting in a decrease in the voltage $V_S$.

At operation 310, the detection circuit 250 may generate the detection signal DT which indicates that the inductor current $I_L$ drops to or below a current threshold $I_{ZCD}$. For example, the voltage $V_S$ may drop below the reference voltage $V_{ZCD}$ such that the detection signal DT is activated to indicate that the inductor current $I_L$ reaches or drops below the current threshold $I_{ZCD}$. At operation 312, the logic circuit 238 may determine whether a mode of the switching regulator 200 is enabled. In the mode, the driver circuit 230 can extend an interval between the time at which the switch Q2 is turned on and the time at which the switch Q2 is turned off. When it is determined that the mode is disabled or not enabled, the flow proceeds to operation 314. Otherwise, the flow proceeds to operations 324 and 326.

At operation 314, the AND gate A2 can output a logical high signal since each of the control signal CSb and the detection signal DT is logically high. The OR gate R2 can reset the SR latch LH2 according to the logical high signal. Accordingly, the driver 234 can turn off the switch Q2. At operation 316, the feedback voltage $V_{FB}$ decreases because of discharging of the capacitor $C_{OUT}$. When the feedback voltage $V_{FB}$ falls below the reference voltage $V_{REF1}$, the flow goes back to operation 302.

At operation 318, the input signal TS1 indicates that the elapsed time since activation of the trigger signal TR1 reaches the predetermined amount of time $T_{MAX}$, which is equal to a maximum permissible switching period of the switching regulator 200. The input signal TS1 is activated. At operation 320, the logic circuit 246 may determine whether the feedback voltage $V_{FB}$ is higher than the reference voltage $V_{REF2}$. When it is determined that the feedback voltage $V_{FB}$ is higher than the reference voltage $V_{REF2}$, the flow proceeds to operation 322. Otherwise, the flow goes back to operation 302. For example, when the comparison signal CP2 is logically low, the logic circuit 246 can determine that the feedback voltage $V_{FB}$ is lower than the reference voltage $V_{REF2}$. When the comparison signal CP2 is logically high, the logic circuit 246 can determine that the feedback voltage $V_{FB}$ is higher than the reference voltage $V_{REF2}$. At operation 322, the SR latch LH3 can change to the set state. The control signal CS goes high to indicate that the mode is enabled.

At operation 324, the logic circuit 238 may determine whether the feedback voltage $V_{FB}$ drops below the reference voltage $V_{REF2}$. When it is determined that the feedback voltage $V_{FB}$ drops below the reference voltage $V_{REF2}$, the flow proceeds to operation 328. For example, when the comparison signal CP2b, i.e. an inverted signal of the comparison signal CP2, is logically high, the logic circuit 238 can determine that the feedback voltage $V_{FB}$ drops below the reference voltage $V_{REF2}$. At operation 326, the timer 160 is activated by the detection signal DT to measure an elapsed time since activation of the detection signal DT. When the elapsed time reaches the predetermined amount of time $T_{EXT}$, the flow proceeds to operation 328. At operation 328, each of the OR gate R3 and the AND gate A3 can output a logical high signal. The OR gate R2 can reset the SR latch LH2. Accordingly, the driver 234 can turn off the switch Q2.

At operation 330, the logic circuit 246 may determine whether the feedback voltage $V_{FB}$ is lower than the reference voltage $V_{REF3}$. When it is determined that the feedback voltage $V_{FB}$ is lower than the reference voltage $V_{REF3}$, the flow proceeds to operation 332. Otherwise, the flow proceeds to operation 318. For example, when the comparison signal CP3 is logically high, the logic circuit 246 can determine that the feedback voltage $V_{FB}$ is lower than the reference voltage $V_{REF3}$. When the comparison signal CP3 is logically low, the logic circuit 246 can determine that the feedback voltage $V_{FB}$ is higher than the reference voltage $V_{REF3}$. At operation 332, the SR latch LH3 can change to the reset state. The control signal CS goes low to indicate that the mode is disabled. The flow can proceed to operations 316 and 318.

Figure 4:
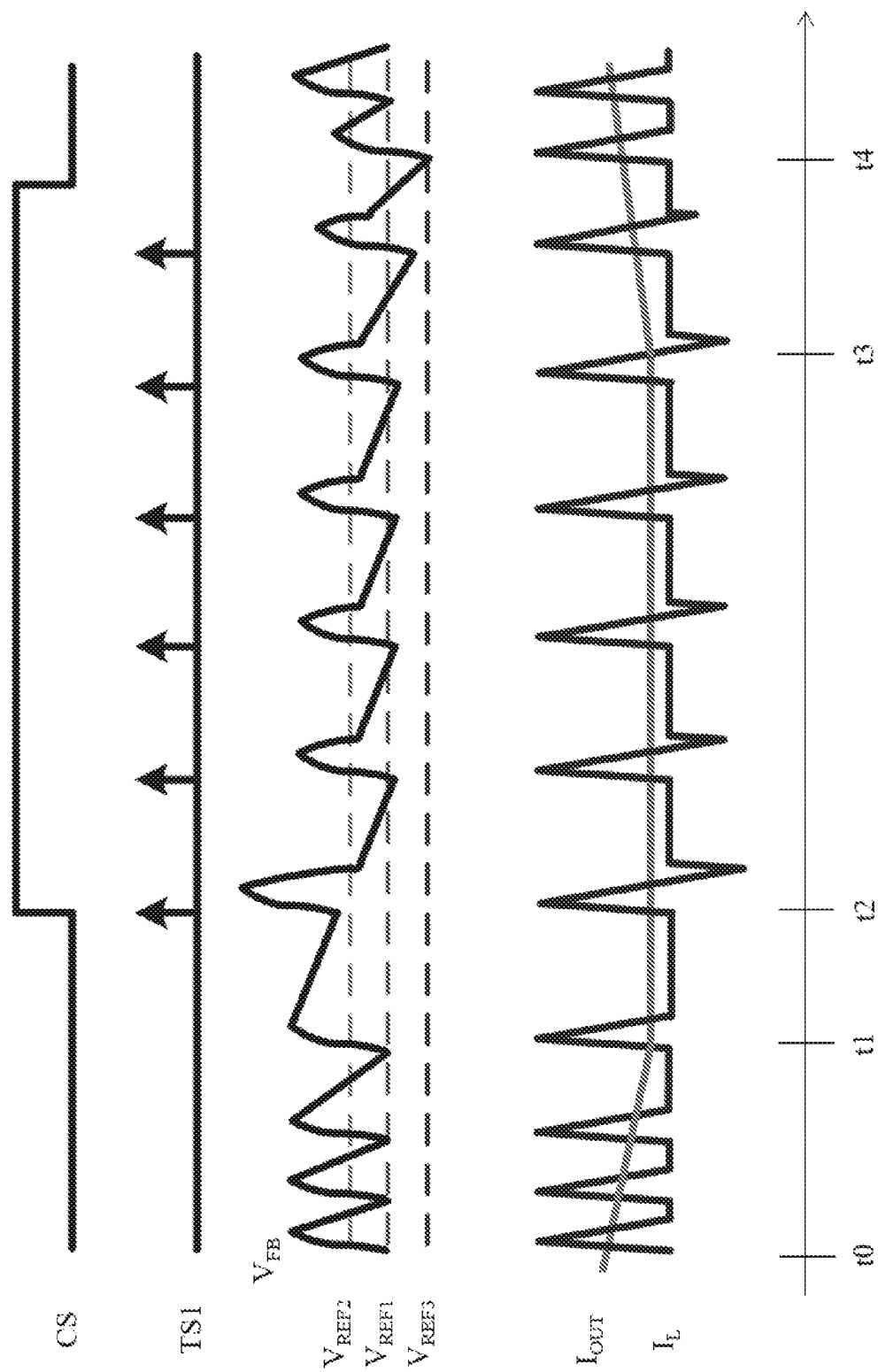
FIG. 4 illustrates signal waveforms associated with operation of the control circuit shown in FIG. 2 in examples of the present disclosure.

FIG. 4 illustrates signal waveforms associated with operation of the control circuit 201 shown in FIG. 2 in examples of the present disclosure. Referring to FIG. 4 and also to FIG. 2, prior to time t0, the switching regulator 200 may operate under a heavy or moderate load condition. For example, the load 103 connected to the switching regulator 200 is a heavy or moderate load. Between time t0 and time t1, the output current $I_{OUT}$ decreases as the load 103 decreases. The control circuit 201 slows down a switching frequency of the switching regulator 200.

At time t1, the timer 110 can be started to measure an elapsed time since activation of the trigger signal TR1. At time t2, the input signal TS1 is rendered active to indicate that the elapsed time reaches the predetermined amount of time $T_{MAX}$. In response to activation of the input signal TS1, the controller 240 can set the control signal CS to a logical high level since the feedback voltage $V_{FB}$ is higher than the reference voltage $V_{REF2}$. The switching regulator 200 enters a mode in which a switching frequency thereof is kept higher than an upper limit of the audible frequency range. For example, a maximum permissible switching period of the switching regulator 200 is set to the predetermined amount of time $T_{MAX}$.

In examples of the present disclosure, when the control signal CS indicates that the mode is enabled, the driver circuit 230 can be configured to block the comparison signal CP1 from controlling the switch Q1. For example, between time t2 and time t3, the AND gate A1 can block the comparison signal CP1 since the control signal CSb is logically low. The SR latch LH1 changes to the set state in response to the input signal TS1. The switching regulator 200 can have a constant or substantially constant switching frequency even if the feedback voltage $V_{FB}$ drops below the reference voltage $V_{REF1}$ before the input signal TS1 is activated.

Additionally, when the control signal CS indicates that the mode is enabled, the driver circuit 230 can be configured to block the detection signal DT from turning off the switch Q2. For example, between time t2 and time t3, the AND gate A2 can block the detection signal DT since the control signal CSb is logically low. The SR latch LH2 may not change to the reset state until the feedback voltage $V_{FB}$ drops below the reference voltage $V_{REF2}$.

At time t3, the output current $I_{OUT}$ increases as the load 103 increases. The valley point of the feedback voltage $V_{FB}$ would drop to a lower point since the output current $I_{OUT}$ increases. At time t4, the feedback voltage $V_{FB}$ drops below the reference voltage $V_{REF3}$. The SR latch LH3 can change to the reset state in response to the comparison signal CP3. The control signal CS transitions to a logical low level to indicate that the switching regulator 200 leaves/exits the mode.

In one example, when the inductor current $I_L$ exhibits a relatively long recovery time, and/or the capacitor $C_{OUT}$ is discharged through the load 103, the output voltage $V_{OUT}$ may undershoot such that the switching regulator 200 might unexpectedly exit the mode. Voltage undershoots are more likely to occur in high duty ratio applications. With the use of the timer 160, the control circuit 201 can reduce the likelihood of or prevent the functional failure caused by voltage undershoots.

Figure 5A:
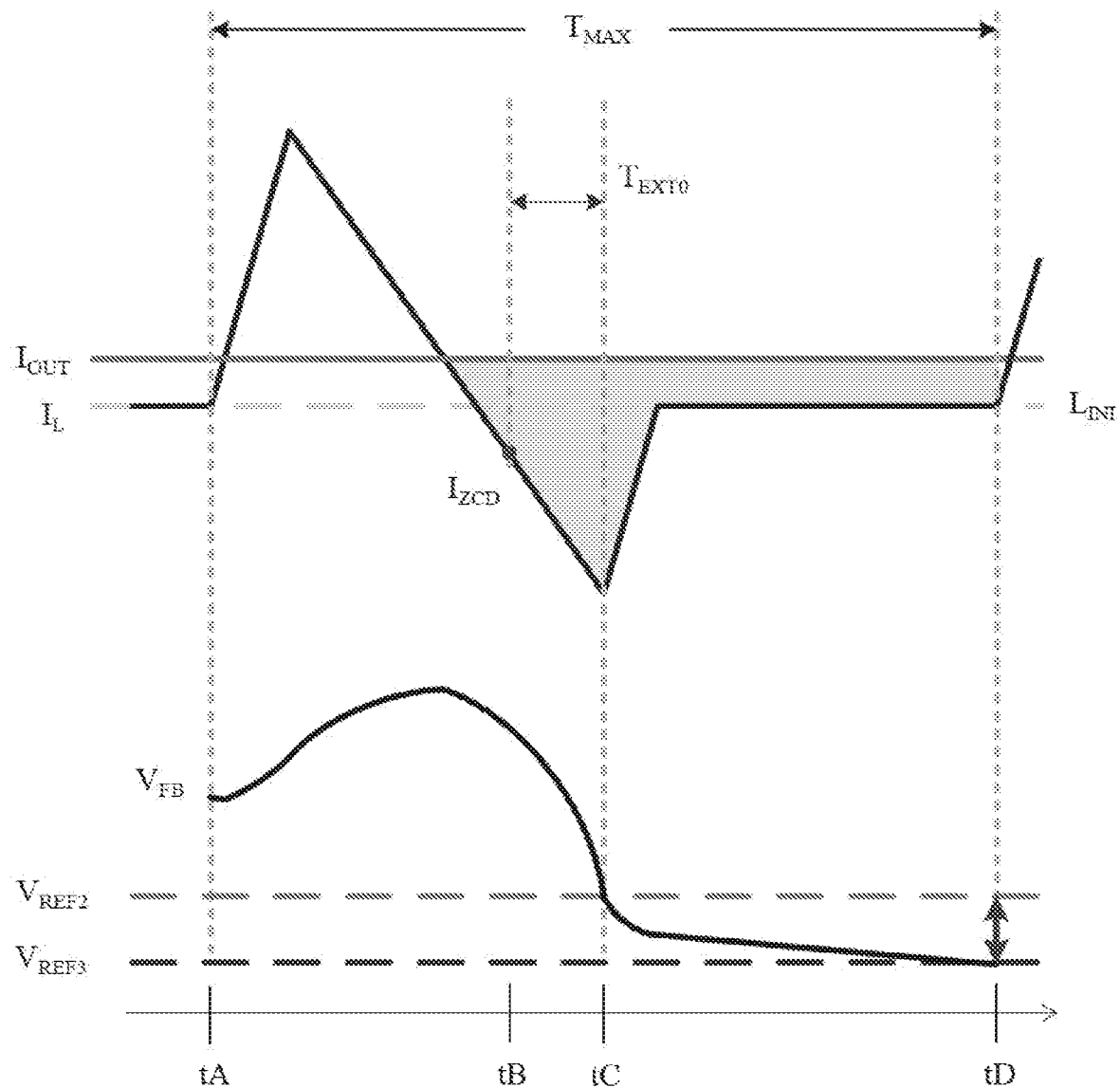
FIG. 5A illustrates signal waveforms associated with operation of the control circuit shown in FIG. 2 in examples of the present disclosure.

FIG. 5A illustrates signal waveforms associated with operation of the control circuit 201 shown in FIG. 2 in some examples where the timer 160 is omitted or kept deactivated. Referring to FIG. 5A and also to FIG. 2, the switching regulator 200 may operate in the mode, and have a switching period equal to the predetermined amount of time $T_{MAX}$. At time tA, the inductor current $I_L$ rises as the switch Q1 is turned on. At time tB, the detection signal DT indicates that the inductor current $I_L$ reaches the current threshold $I_{ZCD}$. As the mode is enabled, the switch Q2 is kept turned, and the inductor current $I_L$ decreases continuously. At time tC, the switch Q2 is turned off since the feedback voltage $V_{FB}$ drops to the reference voltage $V_{REF2}$. An amount of time $T_{EXT0}$ has elapsed since the inductor current $I_L$ reached the current threshold $I_{ZCD}$. As it takes relatively long time for the inductor current $I_L$ to return to a level Levi, and the capacitor $C_{OUT}$ is discharged continuously, the feedback voltage $V_{FB}$ would drop below the reference voltage $V_{REF3}$ at time tD. The switching regulator 200 would unexpectedly exit the mode when a next switching cycle starts.

Figure 5B:
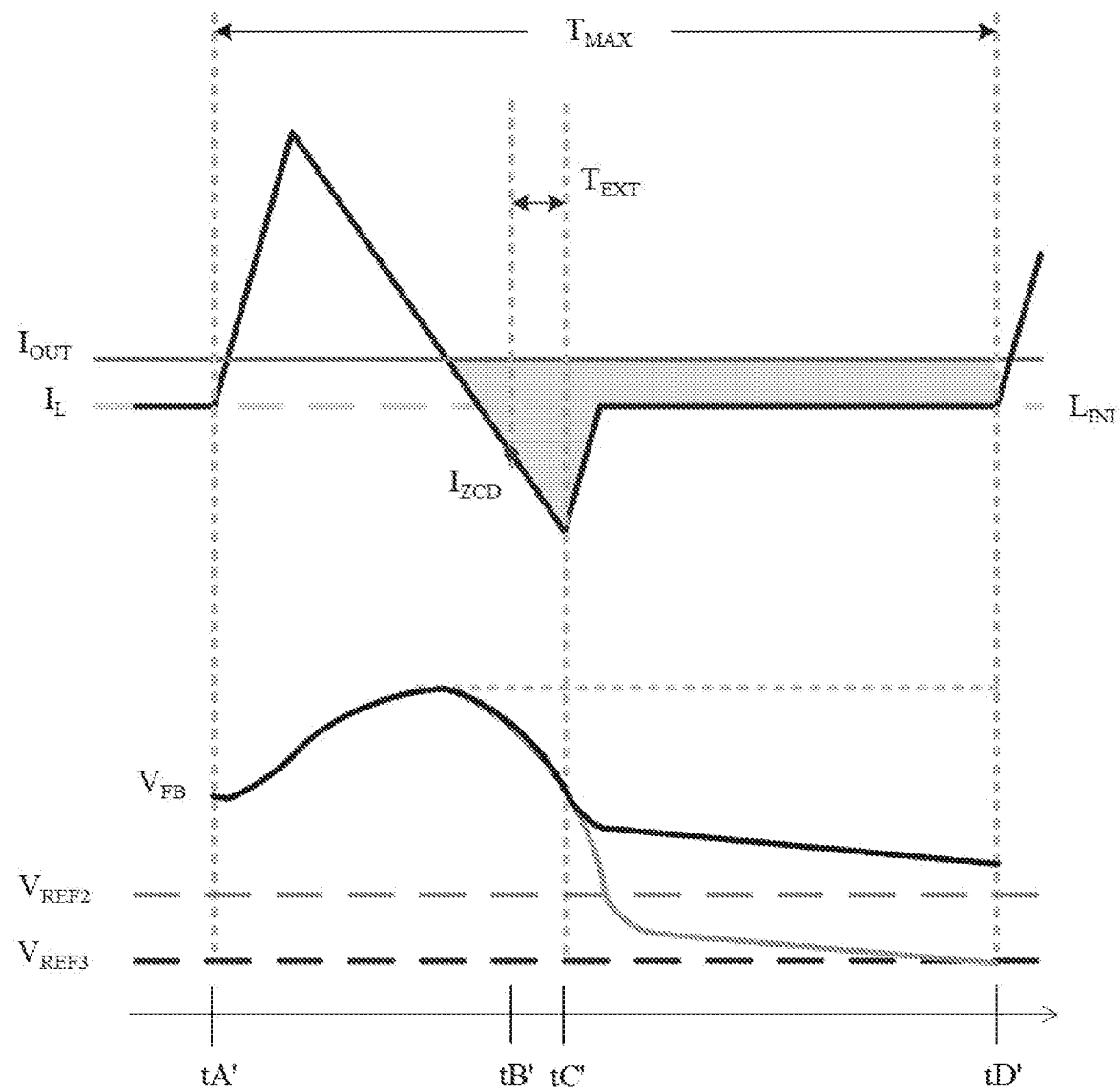
FIG. 5B illustrates signal waveforms associated with operation of the control circuit shown in FIG. 2 in examples of the present disclosure.

FIG. 5B illustrates signal waveforms associated with operation of the control circuit 201 shown in FIG. 2 in some examples of the present disclosure. In examples of the present disclosure, the timer 160 can be activated when the detection signal DT indicates that the inductor current $I_L$ reaches the current threshold $I_{ZCD}$. Referring to FIG. 5B and also to FIG. 2, at time tA', the inductor current $I_L$ rises as the switch Q1 is turned on. At time tB', the detection signal DT indicates that the inductor current $I_L$ reaches the current threshold $I_{ZCD}$. The switch Q2 is kept turned since the mode is enabled. In addition, the timer 160 can be started in response to the detection signal DT. At time tC', the input signal TS2 indicates that the predetermined amount of time $T_{EXT}$ has elapsed. The predetermined amount of time $T_{EXT}$ would be shorter than the amount of time $T_{EXT0}$ shown in FIG. 5A. Thus, the switch Q2 can be turned off even if the feedback voltage $V_{FB}$ is higher than the reference voltage $V_{REF2}$. At time tD', the feedback voltage $V_{FB}$ is still higher than the reference voltage $V_{REF3}$. Functional failure caused by voltage undershoots will not occur.

With the use of the proposed control scheme, a control circuit used for a switching regulator can be implemented using a relatively simple circuit structure to keep a switching frequency outside an audible frequency range under light load conditions, thereby reducing/eliminating audible noise resulting from switching operation. Moreover, the control circuit can flexibly extend on-time of a switch, e.g. a low-side switch, thereby achieving energy balance without causing functional failure.

Figure 6:
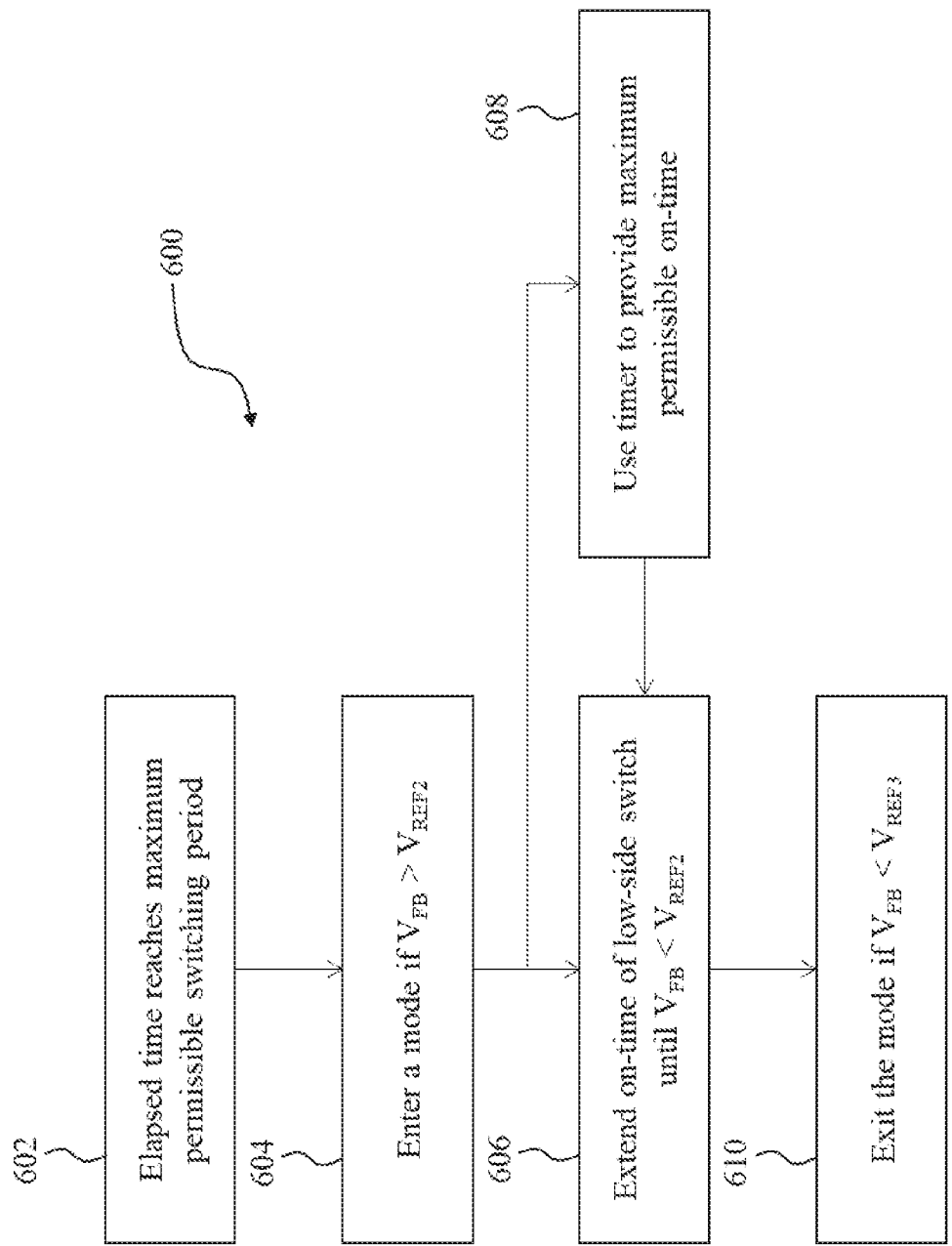
FIG. 6 is a flow chart of an exemplary control method of a switching regulator in examples of the present disclosure.

One embodiment of the proposed control scheme utilizing two reference voltages can be broadly summarized in FIG. 6. Referring to FIG. 6 and also to FIG. 2, at operation 602, the timer 110 asserts the input signal TS1 to indicate that an elapsed time since activation of the switch Q1 reaches a maximum permissible switching period, e.g. the predetermined amount of time $T_{MAX}$. At operation 604, when the feedback voltage $V_{FB}$ rises above the reference voltage $V_{REF2}$, the controller 240 can set the control signal CS to a signal level or bit pattern in response to activation of the input signal TS1. The switching regulator 200 enters a mode such as an ultrasonic mode.

At operation 606, the driver circuit 230 can keep the switch Q2 turned on until the feedback voltage $V_{FB}$ drops below the reference voltage $V_{REF2}$. At operation 608, the timer 160 is activated to reduce the likelihood of or prevent the functional failure caused by voltage undershoots. For example, the timeout period of the timer 160 can serve as a maximum permissible time interval between the time at which the switch Q2 is turned on and the time at which the switch Q2 is turned off. At operation 610, when the feedback voltage $V_{FB}$ drops below the reference voltage $V_{REF3}$, the controller 240 can set the control signal CS to another signal level or bit pattern to disable the mode.

Note that the control method 600 can be employed for controlling the switching regulator 100 shown in FIG. 1 without departing from the scope of the present disclosure. Additionally, in one example, other operations in the control method 600 can be performed. In one example, operations of the control method 600 can be performed in a different order and/or vary. As those skilled in the art can appreciate the operation of the control method 600 after reading the above paragraphs directed to FIG. 1 through FIG. 5B, further description is omitted here for brevity.

Figure 7:
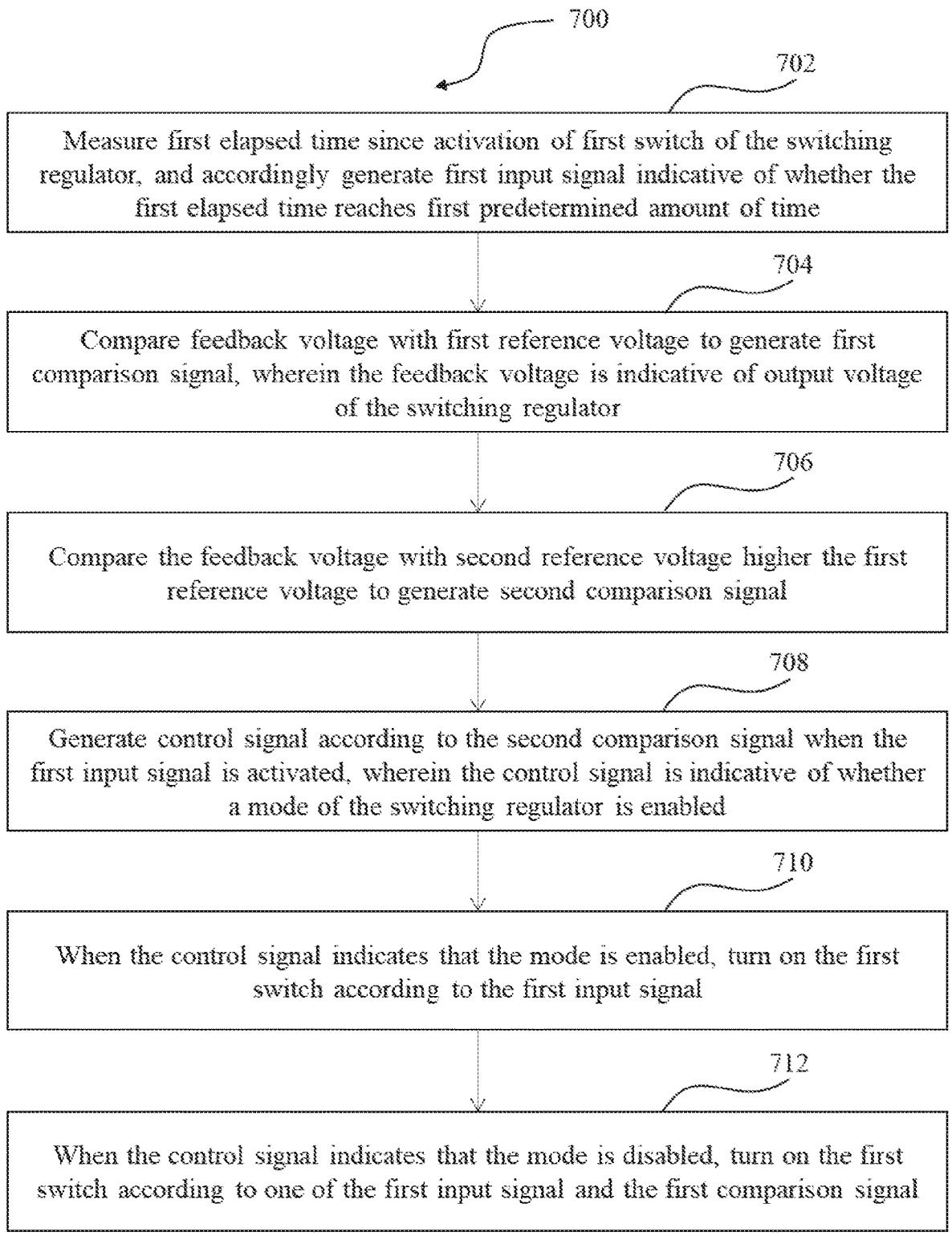
FIG. 7 is a flow chart of an exemplary control method of a switching regulator in examples of the present disclosure.

FIG. 7 is a flow chart of an exemplary control method of a switching regulator in examples of the present disclosure. For illustrative purposes, the control method 700 is described below with reference to the switching regulator 200 shown in FIG. 2. Note that the control method 700 can be employed in the switching regulator 100 shown in FIG. 1 or other types of switching regulators without departing from the scope of the present disclosure. Additionally, in one example, other operations in the control method 700 can be performed. In some other embodiments, operations of the control method 700 can be performed in a different order and/or vary.

At operation 702, a first elapsed time since activation of a first switch of the switching regulator is measured. A first input signal indicative of whether the first elapsed time reaches a first predetermined amount of time is generated accordingly. For example, the timer 110 can measure an elapsed time since activation of the switch Q1, and accordingly generate the input signal TS1 indicative of whether the elapsed time reaches the predetermined amount of time $T_{MAX}$. In examples of the present disclosure, the input signal TS1 can be implemented as a pulse signal, which goes high to indicate that the elapsed time reaches the predetermined amount of time $T_{MAX}$.

At operation 704, a feedback voltage is compared with a first reference voltage to generate a first comparison signal. The feedback voltage is indicative of an output voltage of the switching regulator. For example, the comparator 220 can compare the feedback voltage $V_{FB}$ with the reference voltage $V_{REF1}$ to generate the comparison signal CP1.

At operation 706, the feedback voltage is compared with a second reference voltage higher the first reference voltage to generate a second comparison signal. For example, the controller 240 can compare the feedback voltage $V_{FB}$ with the reference voltage $V_{REF2}$ higher the reference voltage $V_{REF1}$ to generate the comparison signal CP2.

At operation 708, a control signal is generated according to the second comparison signal when the first input signal is activated. The control signal is indicative of whether a mode of the switching regulator is enabled. For example, the controller 240 can generate the control signal CS according to the comparison signal CP2 when the input signal TS1 is activated. In examples of the present disclosure, an output of the AND gate A4 is coupled to the set input S of the SR latch LH3. As a result, an output of the AND gate A4 is determined according to the comparison signal CP2 when the input signal TS1 is logically high.

At operation 710, when the control signal indicates that the mode is enabled, the first switch is turned on according to the first input signal. For example, when the control signal CS indicates that the mode is enabled, the driver circuit 230 can turn on the switch Q1 according to the input signal TS1. In examples of the present disclosure, when the control signal CS indicates that the mode is enabled, the driver circuit 130 can block the comparison signal CP1 from controlling the switch Q1. A switching period of the switch Q1 is equal to or substantially equal to the timeout period of the timer 110.

At operation 712, when the control signal indicates that the mode is disabled, the first switch is turned on according to one of the first input signal and the first comparison signal. For example, when the control signal CS indicates that the mode is disabled, the driver circuit 230 can turn on the switch Q1 according to one of the input signal TS1 and the comparison signal CP1. In examples of the present disclosure, when the input signal TS1 indicates that the elapsed time since activation of the switch Q1 reaches the predetermined amount of time $T_{MAX}$, the driver circuit 230 can turn on the switch Q1 according to the input signal TS1. When the input signal TS1 indicates that the elapsed time since activation of the switch Q1 is shorter than the predetermined amount of time $T_{MAX}$, i.e. the timer 110 has not expired, the driver circuit 230 can on the first switch according to the first comparison signal In one example, the feedback voltage can be compared with a third reference voltage to set a signal level or bit pattern of the control signal. The third reference voltage is lower than or equal to the first reference voltage. For example, the comparator 244 can compare the feedback voltage $V_{FB}$ with the reference voltage $V_{REF3}$ to thereby set the state of the output Q of the SR latch LH3. The switching regulator 200 can leave the mode as long as the feedback voltage $V_{FB}$ drops below the reference voltage $V_{REF3}$.

In one example, a detection signal is generated by detecting if an inductor current flowing through an inductor reaches a current threshold. The inductor is coupled to a node between the first switch and a second switch of the switching regulator. When the control signal indicates that the mode is enabled, the second switch is controlled according to a result of a comparison of the feedback voltage with the second reference voltage. For example, the detection circuit 250 can detect if the inductor current $I_L$ reaches a current threshold, and accordingly generate the detection signal DT. When the control signal CS indicates that the mode is enabled, the switch Q2 can be controlled according to the comparison signal CP2b rather than the detection signal DT since the AND gate A2 can block the detection signal DT from controlling the switch Q2. Moreover, when the timer 160 expires before the feedback voltage $V_{FB}$ drops below the reference voltage $V_{REF2}$, the switch Q2 can be turned off in response to activation of the input signal TS2, thereby reducing the likelihood of the functional failure caused by voltage undershoots.

In examples of the present disclosure, the operation of the control method 700 refers to FIG. 1 through FIG. 6.

Those of ordinary skill in the art may recognize that modifications of the embodiments disclosed herein are possible. For example, the amount of delay before the driver circuit 130 turns off the switch Q2 may vary. Other modifications may occur to those of ordinary skill in this art, and all such modifications are deemed to fall within the purview of the present invention, as defined by the claims.

The invention claimed is:

1. A control circuit for controlling a switching regulator, the control circuit comprising:
   a first timer configured to generate a first input signal indicative of whether a first predetermined amount of time has elapsed since an activation of a drive signal, a first switch of the switching regulator being controlled by the drive signal;
   a first comparator configured to compare a feedback voltage with a first reference voltage so as to generate a first comparison signal, the feedback voltage being indicative of an output voltage of the switching regulator;
   a driver circuit coupled to the first timer and the first comparator, the driver circuit being controlled by a control signal so as to generate the drive signal according to one of the first input signal and the first comparison signal, the control signal indicating whether a mode of the switching regulator is enabled, the driver circuit being configured to generate the drive signal according to the first input signal when the control signal indicates that the mode is enabled; and
   a controller, coupled to the driver circuit and the first timer, the controller being configured to, in response to an activation of the first input signal, generate the control signal according to a result of a comparison of the feedback voltage with a second reference voltage higher than the first reference voltage.

2. The control circuit of claim 1, wherein when the feedback voltage is higher than the second reference voltage, the control signal indicates that the mode is enabled.

3. The control circuit of claim 1, wherein the controller is further configured to compare the feedback voltage with a third reference voltage so as to generate the control signal; and wherein the third reference voltage is lower than or equal to the first reference voltage.

4. The control circuit of claim 3, wherein when the feedback voltage is lower than the third reference voltage, the control signal indicates that the mode is disabled.

5. The control circuit of claim 3, wherein the controller further comprises:
   a second comparator configured to compare the feedback voltage with the second reference voltage so as to generate a second comparison signal;
   a third comparator configured to compare the feedback voltage with the third reference voltage so as to generate a third comparison signal; and
   a logic circuit coupled to the first timer, the second comparator and the third comparator;
   wherein the logic circuit is configured to set the control signal to a signal level according to the second comparison signal when the first input signal is activated; and the logic circuit is configured to set the control signal to another signal level according to the third comparison signal.

6. The control circuit of claim 1, wherein when the control signal indicates that the mode is enabled, the driver circuit is further configured to block the first comparison signal from controlling the first switch.

7. The control circuit of claim 1, further comprising:
   a detection circuit coupled to the driver circuit, the detection circuit being configured to generate a detection signal by detecting if an inductor current flowing through an inductor reaches a current threshold, the inductor being coupled to a node between the first switch and a second switch of the switching regulator;
   wherein when the control signal indicates that the mode is disabled, the driver circuit is configured to turn off the second switch according to the detection signal; when the control signal indicates that the mode is enabled, the driver circuit is configured to turn off the second switch according to a result of a comparison of the feedback voltage with the second reference voltage.

8. The control circuit of claim 7, wherein when the feedback voltage drops below the second reference voltage in the mode, the driver circuit is configured to turn off the second switch.

9. The control circuit of claim 7, further comprising:
   a second timer coupled to the driver circuit and the detection circuit, the second timer being configured to generate a second input signal indicative of whether a second predetermined amount of time has elapsed since the inductor current reached the current threshold;
   wherein when the control signal indicates that the mode is enabled, the driver circuit turns off the second switch according to the second input signal.

10. The control circuit of claim 9, wherein when the control signal indicates that the mode is enabled, and the second input signal indicates that the second predetermined amount of time has elapsed since the inductor current reached the current threshold, the driver circuit turns off the second switch.

11. The control circuit of claim 1, wherein when the control signal indicates that the mode is enabled, the drive signal contains a period equal to the first predetermined amount of time.

12. A control method of a switching regulator, the control method comprising the steps of:
   measuring a first elapsed time since an activation of a first switch of the switching regulator, and accordingly generating a first input signal indicative of whether the first elapsed time reaches a first predetermined amount of time;
   comparing a feedback voltage with a first reference voltage to generate a first comparison signal, wherein the feedback voltage is indicative of an output voltage of the switching regulator;
   comparing the feedback voltage with a second reference voltage higher than the first reference voltage so as to generate a second comparison signal;
   generating a control signal according to the second comparison signal when the first input signal is activated, wherein the control signal is indicative of whether a mode of the switching regulator is enabled;
   when the control signal indicates that the mode is enabled, turning on the first switch according to the first input signal; and
   when the control signal indicates that the mode is disabled, turning on the first switch according to one of the first input signal and the first comparison signal.

13. The control method of claim 12, wherein when the second comparison signal indicates that the feedback voltage is higher than the second reference voltage, the control signal indicates that the mode is enabled.

14. The control method of claim 12, further comprising:
   generating the control signal according to a result of a comparison of the feedback voltage with a third reference voltage, wherein third reference voltage is lower than or equal to the first reference voltage.

15. The control method of claim 14, wherein when the feedback voltage is lower than the third reference voltage, the control signal indicates that the mode is disabled.

16. The control method of claim 12, further comprising:
when the control signal indicates that the mode is enabled, blocking the first comparison signal from controlling the first switch.

17. The control method of claim 12, further comprising:
generating a detection signal by detecting if an inductor current flowing through an inductor reaches a current threshold, wherein the inductor is coupled to a node between the first switch and a second switch of the switching regulator;
when the control signal indicates that the mode is disabled, controlling the second switch according to the detection signal; and
when the control signal indicates that the mode is enabled, controlling the second switch according to a result of a comparison of the feedback voltage with the second reference voltage.

18. The control method of claim 17, wherein the step of controlling the second switch according to the result of the comparison of the feedback voltage with the second reference voltage comprises the sub-step of:
when the feedback voltage drops below the second reference voltage, turning off the second switch.

19. The control method of claim 17, further comprising:
measuring a second elapsed time since the detection signal indicates that the inductor current reached the current threshold, and accordingly generate a second input signal indicative of whether the second elapsed time reaches a second predetermined amount of time; and
when the control signal indicates that the mode is enabled, and the second input signal indicates that the second elapsed time reaches the second predetermined amount of time, turning off the second switch.

20. The control method of claim 12, wherein the step of turning on the first switch according to one of the first input signal and the first comparison signal comprises:
when the first input signal indicates that the first elapsed time reaches the first predetermined amount of time, turning on the first switch according to the first input signal; and
when the first input signal indicates that the first elapsed time is shorter than the first predetermined amount of time, turning on the first switch according to the first comparison signal.

* * * * *